(12) United States Patent
Geen et al.

(10) Patent No.: US 6,735,288 B1
(45) Date of Patent: May 11, 2004

(54) VOICE OVER IP VOICE MAIL SYSTEM CONFIGURED FOR PLACING AN OUTGOING CALL AND RETURNING SUBSCRIBER TO MAILBOX AFTER CALL COMPLETION

(75) Inventors: David William Geen, King George, VA (US); Narasimha K. Nayak, Glen Allen, VA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/479,235

(22) Filed: Jan. 7, 2000

(51) Int. Cl.[7] ................................................. H04M 1/64
(52) U.S. Cl. .................. 379/88.17; 379/69; 379/88.25; 379/210.01; 370/352; 709/231
(58) Field of Search ........................... 379/88.13, 88.14, 379/88.17, 88.22–88.28, 69, 202.01–203.01, 204.01, 205.01, 206.01, 207.01, 210.01; 370/352–357, 259–265; 709/204, 217, 218, 220, 230, 231

(56) References Cited

U.S. PATENT DOCUMENTS

| 4,837,798 A | 6/1989 | Cohen et al. |
| 5,857,013 A | 1/1999 | Yue et al. |
| 6,243,374 B1 * | 6/2001 | White et al. ................. 370/352 |
| 6,335,927 B1 * | 1/2002 | Elliott et al. ................ 370/352 |

OTHER PUBLICATIONS

Thom, "The Multimedia Communications Standard for local Area Networks", H.323 Summary (Aug. 29, 1997).
Purvis et al., "RE: Third party–initiated pause and re–routing", H.323 Implementors Archive for 1999.
Kotha, "Deploying H.323 Applications in Cisco Networks", Cisco Systems, Inc. White Paper (1998).

* cited by examiner

Primary Examiner—Roland G. Foster
(74) Attorney, Agent, or Firm—Leon R. Turkevich

(57) ABSTRACT

An IP telephony gateway and a voice mail resource enable a voice mail subscriber to place an outgoing call to a destination party from a voice mail session via a first Real Time Protocol (RTP) data stream according to the voice over IP (H.323) protocol, and resume the voice mail session upon completion of the outgoing call with the destination party. The voice mail resource initiates a second RTP data stream to a destination party, and uses the Empty Capability Set feature in the H.323 standard to cause the IP telephony gateway to close the first and second RTP data streams to the voice mail resource. The voice mail resource then issues Non-Empty Capability Set messages to the IP telephony gateway for the first and second RTP data streams, causing the IP telephony gateway to internally bridge the first and second RTP data streams, and later to resume the voice mail session.

27 Claims, 3 Drawing Sheets

VOICE OVER IP VOICE MAIL SYSTEM CONFIGURED FOR PLACING AN OUTGOING CALL AND RETURNING SUBSCRIBER TO MAILBOX AFTER CALL COMPLETION

BACKGROUND OF THE INVENTION

1. Field of the Invention

The present invention relates to voice mail systems configured for providing messaging services for subscribers in a voice over Internet Protocol (IP) network according to H.323 protocol.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure. Hence, the reliance on proprietary protocols and closed development environments by telecommunications equipment providers has limited service providers to vendor-specific implementations of voice and telephony services.

One particular problem in existing voice mail systems is the inability to provide more complex features for voice mail subscribers. For example, conventional voice mail systems are limited to allowing a voice mail subscriber to merely retrieve stored voice mail messages, and possibly forward a voice mail message to another voice mail subscriber within the same voice mail system. However, these conventional voice mail systems do not permit a voice mail subscriber to perform more advanced operations.

Assume that a voice mail subscriber calls into his or her voice mailbox to retrieve messages. During the retrieval of messages, the voice mail subscriber desires to return a call to a party that left the voice mail subscriber a message. Normally the voice mail subscriber would need to terminate the voice mail session and manually call back the party that left the message, resulting in substantial inconvenience to the voice mail subscriber. After completing the call with the party that left the message, the voice mail subscriber normally would need to call back into the voice mail system to access his or her mailbox. Hence the voice mail subscriber needs to endure the added inconvenience of calling back the voice mail system: this inconvenience in repeatedly hanging up and redialing the voice system and/or a party having left a message results in annoyance to the voice mail subscriber, as well as increased toll charges.

U.S. Pat. No. 5,857,013 to Yue et al. suggests the desirability of enabling a mobile telephone user to access his or her associated voice mail system and have the system automatically call a number of a person, having left a message, without leaving the voice mail service. Yue et al. merely suggests use of a Bell South service circuit node, available from AT&T network systems, where the system software is coded in the service logic language within a UNIX environment. Yue et al., however, provides no disclosure of how such a system would be implemented in a telephone network such as a mobile telephone system or the public switched telephone network.

Voice over IP technology is under development as part of an alternative open packet telephony communications network, distinct from the public (circuit switched) telephone network, capable of using packet switched networks for integrating voice, data, facsimile, and Internet services, and the like. New packet telephony voice services are being built from open standards such as The International Telecommunications Union (ITU) Recommendation H.323. Recommendation H.323 defines the components, procedures, and protocols necessary to provide audiovisual communications on local area networks. Recommendation H.323 is based on the Real Time Protocol/Control Protocol (RTP/RTCP) of the Internet Engineering Task Force (IETF), and applies to either point-to-point or multipoint sessions, and references many other ITU recommendations, including H.225 and H.245. Recommendation H.225 specifies messages for call control including signaling, registration and admissions, and packetization/synchronization of media streams. Recommendation H.245 specifies messages for opening and closing channels for media streams, and other commands, requests and indications.

Although voice over IP systems are being deployed to provide point-to-point voice communications services, the current H.323 standard does not provide a direct means for enabling a voice mail subscriber to place an outbound call from a voice mail system, and then return to the voice mailbox after call completion.

SUMMARY OF THE INVENTION

There is a need for an enhanced voice over IP voice mail system that enables a voice mail subscriber to initiate an outgoing call from the voice mail system, and return to the voice mail system upon completion of the outgoing call, while maintaining a single voice over IP connection with the voice mail system.

There is also a need for an arrangement that enables a voice mail system to redirect voice over IP connections between a voice mail subscriber and a called party without introducing substantial processing requirements on the voice mail system.

These and other needs are attained by the present invention, where an IP telephony gateway and a voice mail resource enable a voice mail subscriber to place an outgoing call to a destination party from a voice mail session according to the voice over IP (H.323) protocol, and resume the voice mail session upon completion of the outgoing call with the destination party. The IP telephony gateway generates Real Time Protocol (RTP) data streams in response to commands from the voice mail resource, which monitors connections between the voice mail subscriber and the destination party; based on detecting a prescribed condition between the voice mail subscriber and the destination party, the voice mail resource causes the IP telephony gateway to resume the voice mail session, for example using the Empty Capability Set feature in the H.323 standard to perform the outbound call with return capability.

According to one aspect of the present invention, a method is provided in a voice mail resource configured for providing voice mail services to a voice mail subscriber. The method includes establishing a first Real Time Protocol (RTP) data stream for a voice mail session with the voice mail subscriber according to H.323 protocol, initiating a second RTP data stream to a destination party in response to reception of a prescribed command from the voice mail subscriber, and connecting the first and second RTP data streams in response to detecting a first prescribed condition from the destination party. The voice mail session is resumed with the voice mail resource in response to detecting a second prescribed condition between the voice mail subscriber and the destination party. The initiation of the second RTP data stream, and the connecting under the control of the voice mail resource enables the voice over IP voice mail system to perform the outbound call with return capability, enabling the voice mail subscriber to return back to his or her mailbox upon completion of the outbound call.

Another aspect of the present invention provides a system configured for providing voice mail services to a voice mail subscriber over an Internet protocol (IP) telephony link. The system includes an IP telephony gateway configured for establishing Real Time Protocol (RTP) data stream connections according to H.323 protocol, and a voice mail resource. The voice mail resource is configured for establishing a first RTP data stream connection with the voice mail subscriber via the IP telephony gateway for a voice mail session, and initiating a second RTP data stream to a destination party for establishment of a call between the voice mail subscriber and the destination party. The voice mail resource resumes the voice mail session with the voice mail subscriber in response to a detected disconnect condition between the voice mail subscriber and the destination party.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
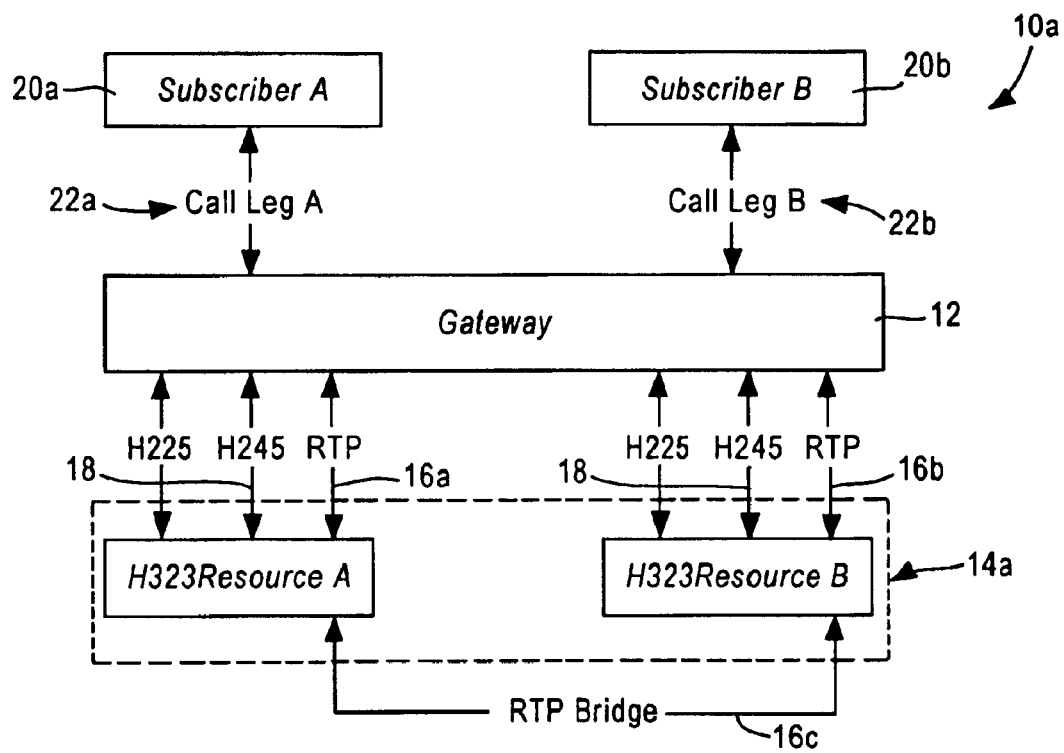
FIG. 1 is a block diagram illustrating a voice over IP voice mail system configured for redirecting RTP data streams according to one embodiment of the present invention.
Figure 2:
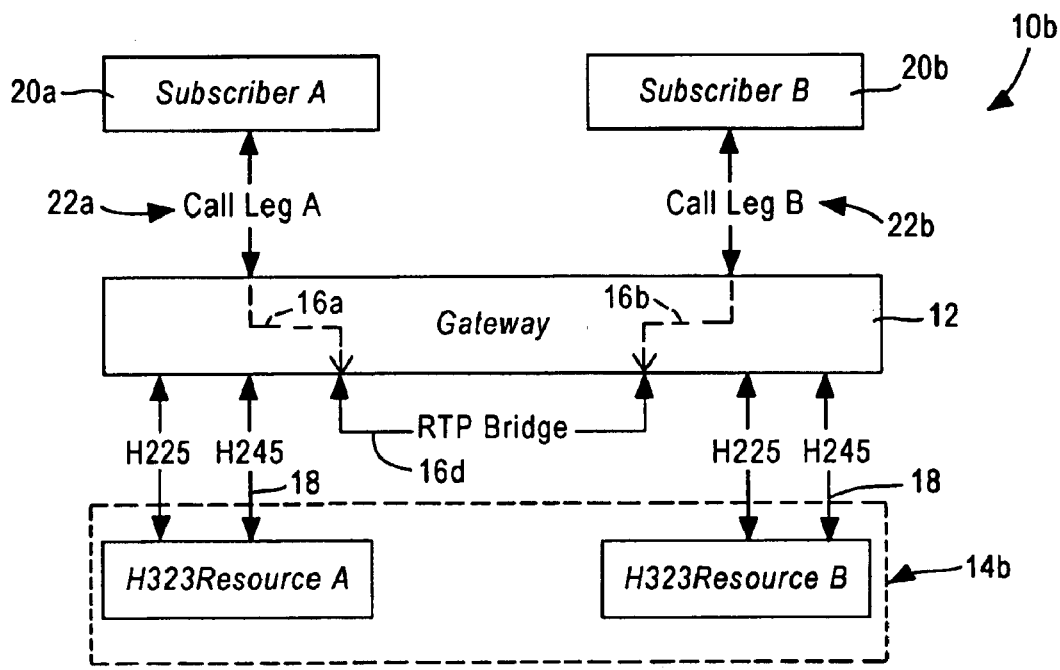
FIG. 2 is a block diagram illustrating another voice over IP voice mail system configured for redirecting RTP data streams according to another embodiment of the present invention.

FIGS. 1 and 2 are diagrams illustrating voice over IP voice mail systems configured for redirecting RTP data streams according to first and second embodiments of the present invention, respectively. Each system 10 includes an IP telephony gateway 12 configured for establishing Real Time Protocol (RTP) data stream connections according to H.323 protocol. Each system 10 also includes a voice mail resource 14 configured for controlling the establishment of the RTP data streams 16 by exchanging control and signaling commands across the H.245 channel 18. In particular, the voice mail resource 14 is implemented as an H.323 compliant software resource configured for executing voice mail applications; the voice mail resource 14 controls the IP telephony gateway 12 via the H.245 channel 18 for call setup and tear down, and redirecting of voice media traffic along the RTP data streams 16. Note that the voice mail resource 14 is illustrated as having discrete resources A and B for the sake of describing the RTP data streams 16a, 16b, 16c, and 16d although actual implementation of the voice mail resource may use a single instance of an H.323 resource. An exemplary implementation of the voice mail resource 14 is the commercially available Cisco Unified Open Network Exchange (Cisco uOne) (Products UONE-FOUND4.1S, and UONE-VOICEMSG4.1S) from Cisco Systems, Inc.

The IP telephony gateway 12, implemented for example using a Cisco AS5300 Universal Access Server, is configured for setting up call connections with subscribers 20 across a voice over IP link 22, or alternately a PSTN communication link.

Figure 3A:
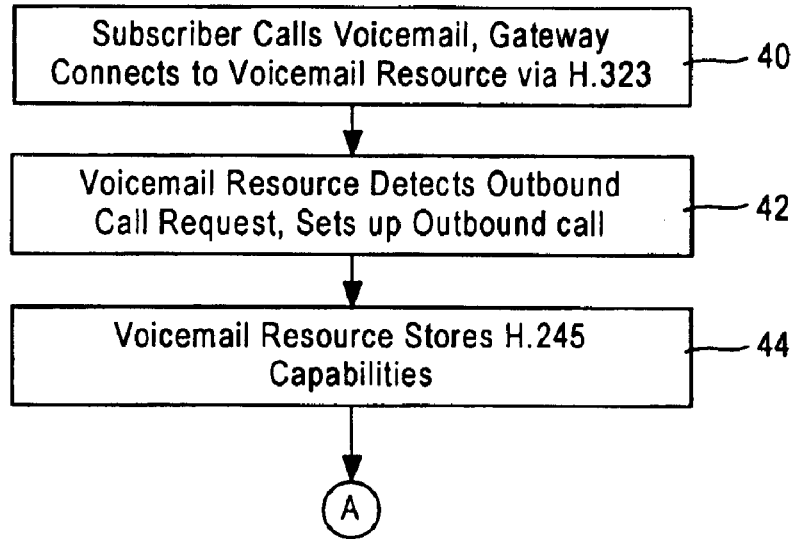
FIGS. 3A, 3B and 3C are diagrams summarizing a method in a voice mail system for redirecting RTP data streams for placing an outgoing call and returning the voice mail subscriber to his or her mailbox after call completion according to an embodiment of the present invention.
Figure 3B:
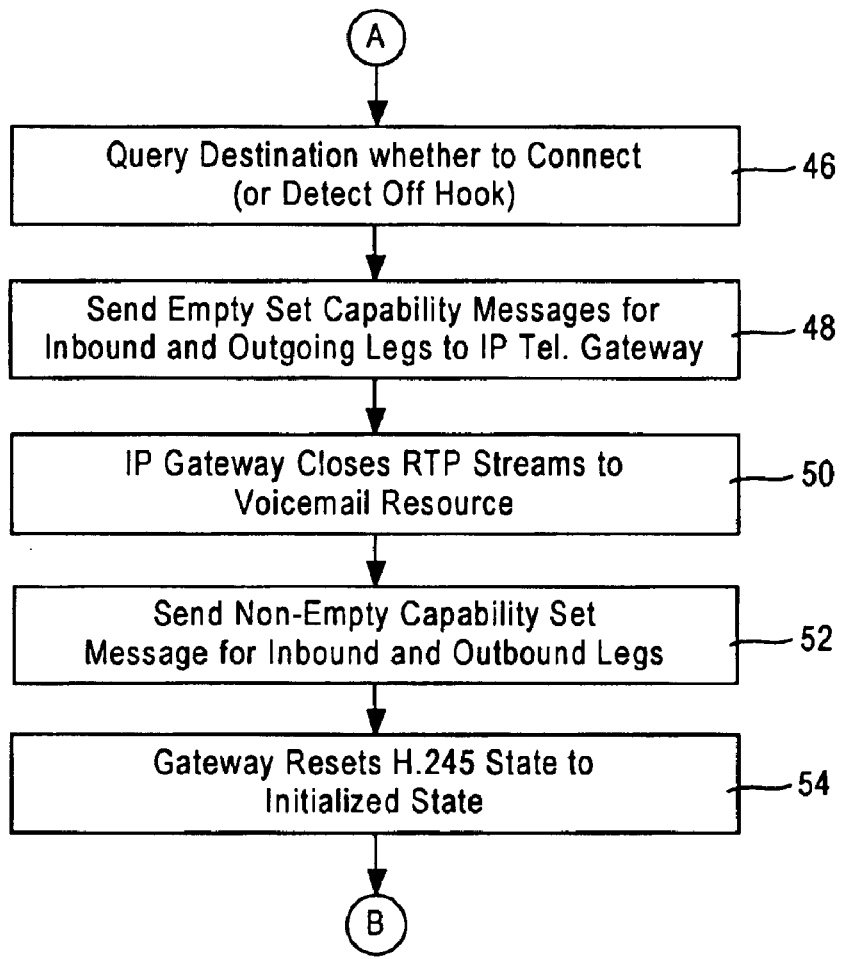
Figure 3C:
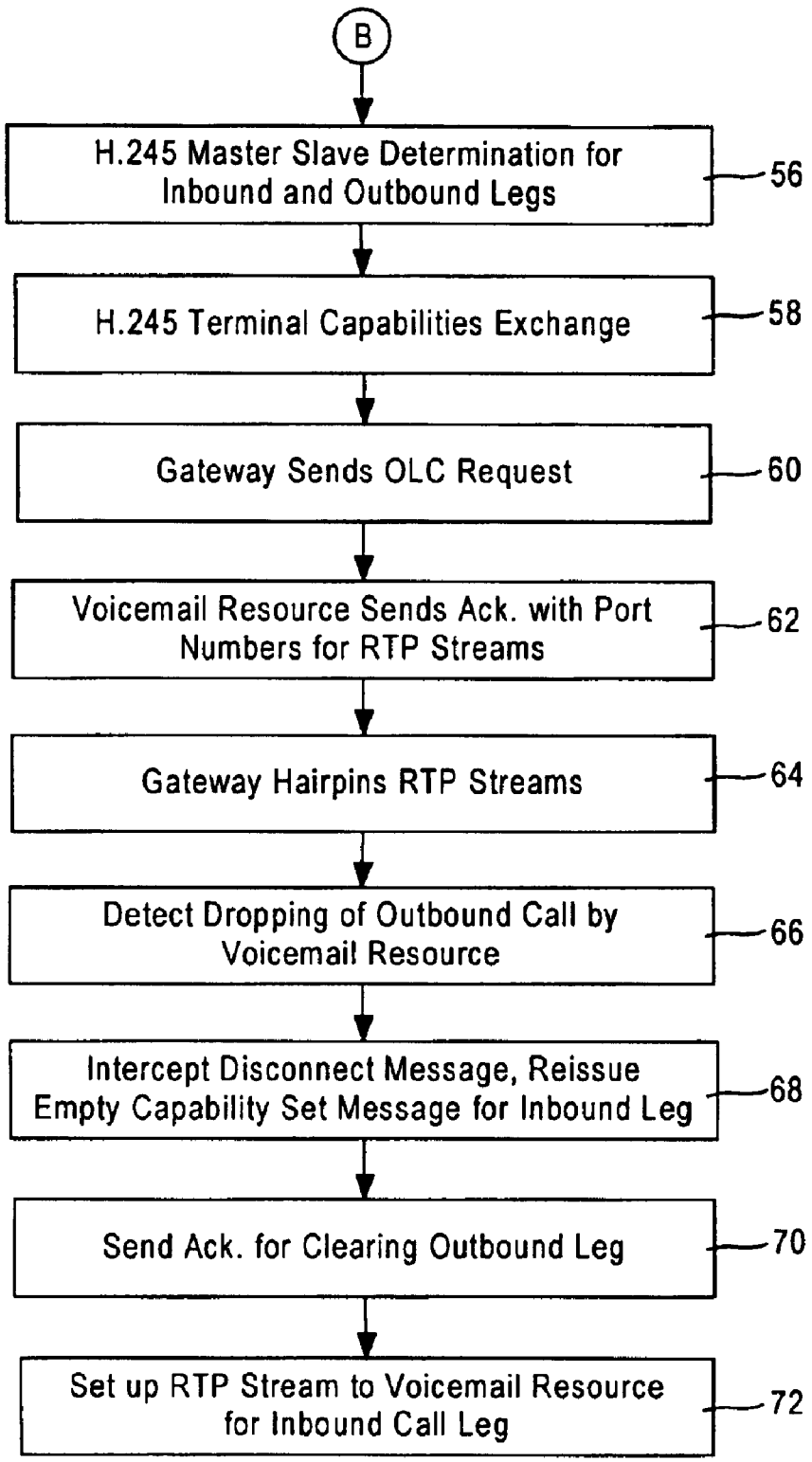

FIGS. 3A, 3B, and 3C summarize a method of placing an outgoing call and returning the subscriber 20a to his or her mailbox after call completion by the voice mail resource 14b according to first and second embodiments of the present invention. The steps may be implemented as executable code stored on a tangible medium, for example a disk drive, a compact disc, or a transmission line medium. FIG. 3A illustrates the initial steps that are performed by voice mail resources 14a and 14b according to the first and second embodiments, respectively. Typically a voice mail subscriber accesses his or her voice mail system by placing a call to the voice mail system 14 in step 40. In particular, assume that the voice mail subscriber 20a places a voice over IP call to the voice mail resource 14 via the IP telephony gateway 12; the voice mail resource 14 establishes an RTP data stream 16a for a voice mail session with the voice mail subscriber 20a by providing signaling instructions to the IP telephony gateway 12. The IP telephony gateway 12 in response supplies the RTP data stream 16a to the voice mail resource 14.

Assume that during the course of the voice mail session, the voice mail subscriber 20a decides to return a call to a destination party 20b having left a message, but does not wish to leave the voice mail session. One problem with the H.323 standard is that the H.323 standard does not specify how a voice mail subscriber can return back to his or her mailbox upon completion of the outbound call to subscriber 20b; in addition, the H.323 standard does not specify how the RTP media streams 16 may be redirected through the IP telephony gateway 12 for voice quality and performance reasons.

According to the disclosed embodiment, the voice mail resource 14 initiates bridging of the RTP audio streams of the two call legs 22a and 22b while maintaining control of both legs. Hence, a voice mail subscriber 20a may suspend his or her session with the voice mail resource 14 and call the destination party 20b to respond to a voice mail message left by the destination party 20, and then return to the voice mail resource 14 upon completion of the call with the destination party 20b.

The voice mail resource 14, during a voice mail session with the voice mail subscriber 20a via the RTP stream 16a, initiates in step 42 a second RTP data stream 16b to the destination party 20b in response to a prescribed command from the voice mail subscriber, for example the voice mail subscriber 20a responding to a menu prompt to reply to a voice message. As part of the call setup and establishment of the second RTP stream 16b, the voice mail resource 14 communicates with the H.323 resource within the IP telephony gateway 12 and stores the H.245 protocol capabilities (e.g., what codec to use, port number for sending media streams, etc.) from the IP telephony gateway 12 for the outbound call 22b in step 44. The IP telephony gateway 12 then establishes a connection via the call leg 22b and the second RTP stream 16b between the destination party 20b and the voice mail resource 14, enabling the voice mail resource 14 to determine whether the first RTP stream 16a and the second RTP stream 16b should be bridged.

FIG. 1 illustrates one embodiment for redirecting RTP streams to perform outbound calls with return capability. Upon detecting across the H.245 channel that the IP telephony gateway 12 has established the call leg 22b with the destination party 20b, the voice mail resource 14a initiates its own RTP bridge 16c to connect the first RTP data stream 16a and the second RTP data stream 16b. At this point the voice mail subscriber 20a may converse with the destination party 20b. Once a disconnect condition is detected on the call leg 22b, the voice mail resource 14a terminates the bridge 16c and continues the voice mail session with the subscriber 20a.

One disadvantage of the arrangement in FIG. 1 is that the voice mail resource 14a needs to set up the bridge 16c, transfer the media streams of RTP streams 16a and 16b across the bridge 16c, and tear down the bridge 16c upon completion of the call between the voice mail subscriber 20a and the destination party 20b; hence, the processing burdens on the voice mail resource 14a requires substantial central processing unit (CPU) resources, affecting the scalability of the system 10a for a large number of voice mail subscribers.

According to the second embodiment described in detail below with respect to FIGS. 2 and 3B–3C, audio (RTP) transport responsibility is transferred from the voice mail resource 14b to the IP telephtony gateway 12, relieving the voice mail resource 14b of RTP transport responsibilities while the calls are bridged. The voice mail resource 14b, in response to reception of a prescribed command from the voice mail subscriber 20a across a first RTP data stream (e.g., 16a), initiates a second RTP data stream (e.g., 16b) by the IP telephony gateway 12 in steps 42 and 44 for connection via the call leg 22b to the destination party 20b, similar to the arrangement of FIG. 1.

Upon determining in step 46 a prescribed condition at the destination party 20b, for example detecting an off hook condition or in response to a prompt whether to connect the destination party 20b to the voice mail subscriber 20a, the voice mail resource 14b initiates closing of the first RTP data stream 16a and the second RTP data stream 16b to the voice mail resource 14b in step 48, and initiates in step 52 the connection of the data streams 16a and 16b to form the RTP bridge 16d. Specifically, the voice mail resource 14b in step 48 sends Empty Capability Set Messages for the RTP data stream 16a and the RTP data stream 16b via the H.245 channel 18 to the IP telephony gateway 12. According to H.323 protocol, if the IP telephony gateway 12 receives an Empty Capability Set Message (i.e., a capabilities message that does not specify capability information), the IP telephony gateway 12 is to reset and enter a Pause state. Hence, in response to receiving the Empty Capability Set Messages for the RTP streams 16a and 16b, the IP telephony gateway 12 in step 50 closes the RTP channels 16a and 16b to the voice mail resource 14 and enters a pause state, releasing the voice mail resource 14b from the media streams 16 between the voice mail subscriber 20a and the destination party 20b.

After dropping the RTP connections 16a and 16b between the IP telephony gateway 12 and the voice mail resource 14b, the voice mail resource 14b initiates in step 52 the formation of the RTP bridge 16 to connect the RTP data stream 16a and the RTP data stream 16b internally within the IP telephony gateway 12. Specifically, the voice mail resource 14b sends Non-Empty Capability Set Messages over the H.245 channels 18 for both the inbound call leg 22a and the outbound call leg 22b to the IP telephony gateway 12. The IP telephony gateway 12 in response connects the RTP media streams 16a and 16b according to H.323 protocol, effectively forming the RTP bridge 16d, by resetting its H.245 state to an initialized state in step 54, performing Master Slave Determination in step 56, and Terminal Capabilities exchange in step 58; the IP telephony gateway 12 sends an Open Logical Channel (OLC) request in step 60, and the voice mail resource 14b responds in step 62 with an acknowledgment that includes media stream addresses specifying the RTP port numbers for the RTP streams 16a and 16b. The IP telephony gateway 12 thus connects (i.e., "hairpins") the media streams 16a and 16b in step 64, effectively forming the bridge 16d.

Hence, the voice mail resource 14b redirects RTP streams through the IP telephony gateway 12 by sending Empty Capability Set messages to the H.323 resource module within the IP telephony gateway 12, causing the IP telephony gateway 12 to drop existing RTP streams between the IP telephony gateway 12 and the voice mail resource 14b ; the voice mail resource 14bcan then redirect the RTP data streams by sending Non-Empty Capability Set messages for both the inbound and outbound call legs 22a and 22b, enabling the IP telephony gateway 12 to use its resources in managing the call flow between the voice mail subscriber 20a and the destination party 20b.

The voice mail resource 14b monitors the progress of the bridged call using the H.225/H.245 channel(s) 18. Upon detecting that the outbound call 22b is dropped by the called party 20b in step 66, the voice mail resource 14b reissues an Empty Capability Set Message for the inbound call leg 22a in step 68, causing the IP telephony gateway 12 to break down the RTP bridge 16d and enter a pause state. The voice mail resource 14b sends an acknowledgment on the outbound call leg 22b in step 70 to clear the call, and repeats the process for setting up the RTP stream 16a between the subscriber 20a and the voice mail resource 14b in step 72 by sending a Non-Empty Capability Set message for the inbound call leg 22a.

According to the disclosed embodiment, a voice over IP voice mail system enables a voice mail subscriber to place an outbound call from a voice mail system, and then return to the voice mailbox after call completion. Use of the Empty Capability Set feature in the H.323 standard enables the redirect feature to be implemented in voice over IP systems with minimal effort. In addition, use of the voice over IP gateway to redirect the call and maintain the connections minimizes the resource requirements for the voice mail system, providing scalability as the number of users are increased.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a voice mail resource configured for providing voice mail services to a voice mail subscriber, the method comprising:

establishing a first Real Time Protocol (RTP) data stream for a voice mail session with the voice mail subscriber according to H.323 protocol;

initiating a second RTP data stream to a destination party in response to reception of a prescribed command from the voice mail subscriber;

connecting the first and second RTP data streams in response to detecting a first prescribed condition from the destination party; and resuming the voice mail session with the voice mail resource in response to detecting a second prescribed condition between the voice mail subscriber and the destination party;

wherein the initiating step includes:
determining a destination phone number and initiating a call to the destination phone number;
storing H.245 protocol capabilities of the destination phone number as the call is initiated; and
establishing the second RTP data stream to the destination party upon termination of the call.

2. The method of claim 1, wherein the step of initiating a call to the destination phone number includes initiating the call by the voice mail resource using an IP telephony gateway.

3. The method of claim 2, wherein the step of establishing the second RTP data stream includes initiating the second RTP data stream in response to detecting an off hook condition at the destination phone number.

4. The method of claim 3, wherein the connecting step includes:
sending the destination party a prompt whether to establish a connection with the voice mail subscriber; and
detecting an acknowledgment to the prompt from the destination party as the first prescribed condition.

5. A method in a voice mail resource configured for providing voice mail services to a voice mail subscriber, the method comprising:

establishing a first Real Time Protocol (RTP) data stream for a voice mail session with the voice mail subscriber according to H.323 protocol;

initiating a second RTP data stream to a destination party in response to reception of a prescribed command from the voice mail subscriber;

connecting the first and second RTP data streams in response to detecting a first prescribed condition from the destination party; and resuming the voice mail session with the voice mail resource in response to detecting a second prescribed condition between the voice mail subscriber and the destination party;

wherein the step of connecting the first and second RTP data streams includes closing the first and second RTP data streams to the voice mail resource by sending to an IP telephony gateway, configured for establishing the first and second RTP data streams with the voice mail subscriber and the destination party, respectively, Empty Capability Set messages across an H.245 protocol channel for the first and second RTP data streams, respectively, wherein the IP telephony gateway in response closes the first and second RTP data streams to the voice mail resource.

6. The method of claim 5, wherein the step of connecting the first and second RTP data streams further includes:
resetting the IP telephony gateway to an initialized state by sending a Non-Empty Capability Set message for the first and second RTP data streams; and connecting within the IP telephony gateway a first port servicing the first RTP data stream with a second port servicing the second RTP data stream.

7. The method of claim 6, wherein the step of connecting the first and second port includes supplying to the IP telephony gateway a first RTP port number specifying the first port for connection with the second port, and a second RTP port number specifying the second port for connection with the first port.

8. The method of claim 6, wherein the resuming step includes:
detecting a disconnect message based on the destination party disconnecting from the second RTP data stream;
sending an acknowledgment to the IP telephony gateway to clear the second RTP data stream; and
reconnecting with the first RTP data stream to resume the voice mail session.

9. The method of claim 8, wherein the reconnecting step includes:
reissuing an Empty Capability Set Message to the IP telephony gateway for the first RTP data stream; and
setting up the first RTP data stream for reception by the voice mail resource.

10. The method of claim 1, wherein the resuming step includes:
detecting a disconnect message based on the destination party disconnecting from the second RTP data stream;
sending an acknowledgment to an IP telephony gateway to clear the second RTP data stream; and
reconnecting with the first RTP data stream to resume the voice mail session.

11. A method in a voice mail resource configured for providing voice mail services to a voice mail subscriber, the method comprising:

establishing a first Real Time Protocol (RTP) data stream for a voice mail session with the voice mail subscriber according to H.323 protocol;

initiating a second RTP data stream to a destination party in response to reception of a prescribed command from the voice mail subscriber;

connecting the first and second RTP data streams in response to detecting a first prescribed condition from the destination party; and resuming the voice mail session with the voice mail resource in response to detecting a second prescribed condition between the voice mail subscriber and the destination party;

wherein the resuming step includes:
(1) detecting a disconnect message based on the destination party disconnecting from the second RTP data stream,
(2) sending an acknowledgment to an IP telephony gateway to clear the second RTP data stream, and
(3) reconnecting with the first RTP data stream to resume the voice mail session:
wherein the reconnecting step includes:
(1) issuing an Empty Capability Set Message to the IP telephony gateway for the first RTP data stream; and
(2) setting up the first RTP data stream for reception by the voice mail resource.

12. A system configured for providing voice mail services to a voice mail subscriber over an Internet protocol (IP) telephony link, the system comprising:
an IP telephony gateway configured for establishing Real Time Protocol (RTP) data stream connections according to H.323 protocol; and a voice mail resource configured for establishing a first RTP data stream connection with the voice mail subscriber via the IP telephony gateway for a voice mail session, the voice mail resource configured for initiating a second RTP data stream to a destination party for establishment of a call between the voice mail subscriber and the destination party, the voice mail resource resuming the voice mail session with the voice mail subscriber in response to a detected disconnect condition between the voice mail subscriber and the destination party;

wherein the voice mail resource establishes the call by sending bridging commands to the IP telephony gateway, the IP telephony gateway in response closing the first and second RTP data streams to the voice mail resource and bridging the first and second RTP data streams.

13. A system configured for providing voice mail services to a voice mail subscriber over an Internet protocol (IP) telephony link, the system comprising:

an IP telephony gateway configured for establishing Real Time Protocol (RTP) data stream connections according to H.323 protocol; and a voice mail resource configured for establishing a first RTP data stream connection with the voice mail subscriber via the IP telephony gateway for a voice mail session, the voice mail resource configured for initiating a second RTP data stream to a destination party for establishment of a call between the voice mail subscriber and the destination party, the voice mail resource resuming the voice mail session with the voice mail subscriber in response to a detected disconnect condition between the voice mail subscriber and the destination party;

wherein the voice mail resource outputs Empty Capability Set messages for the first and second RTP data streams to the IP telephony gateway across an H.245 channel, the IP telephony gateway in response closing the first and second RTP data streams to the voice mail resource.

14. The system of claim 13, wherein the voice mail resource outputs Non-Empty Capability Set messages for the first and second RTP data streams to the IP telephony gateway across the H.245 channel, the IP telephony gateway in response initiating bridging of the first and second RTP data streams.

15. The system of claim 14, wherein the IP telephony gateway initiates the bridging by sending an Open Logical Channel request to the voice mail resource, the voice mail resource in response sending an acknowledgment and media stream addresses for the first and second RTP data streams, the IP telephony gateway bridging the first and second RTP data streams based on the media stream addresses.

16. A system configured for providing voice mail services to a voice mail subscriber over an Internet protocol (IP) telephony link, the system comprising:

an IP telephony gateway configured for establishing Real Time Protocol (RTP) data stream connections according to H.323 protocol; and a voice mail resource configured for establishing a first RTP data stream connection with the voice mail subscriber via the IP telephony gateway for a voice mail session, the voice mail resource configured for initiating a second RTP data stream to a destination party for establishment of a call between the voice mail subscriber and the destination party, the voice mail resource resuming the voice mail session with the voice mail subscriber in response to a detected disconnect condition between the voice mail subscriber and the destination party;

wherein the voice mail resource, in response to detecting the disconnect condition, outputs to the IP telephony gateway an Empty Capability Set message for the first RTP data stream and an acknowledgment to clear the second RTP data stream, for reconnection of the first RTP stream with the voice mail resource.

17. A computer readable medium having stored thereon sequences of instructions for executing voice mail services by a voice mail resource for a voice mail subscriber, the sequences of instructions including instructions for performing the steps of:

establishing a first Real Time Protocol (RTP) data stream for a voice mail session with the voice mail subscriber according to H.323 protocol;

initiating a second RTP data stream to a destination party in response to reception of a prescribed command from the voice mail subscriber;

connecting the first and second RTP data streams in response to detecting a first prescribed condition from the destination party; and resuming the voice mail session with the voice mail resource in response to detecting a second prescribed condition between the voice mail subscriber and the destination party;

wherein the initiating step includes:
determining a destination phone number and initiating a call to the destination phone number;
storing H.245 protocol capabilities of the destination phone number as the call is initiated; and
establishing the second RTP data stream to the destination party upon termination of the call.

18. The medium of claim 17, wherein the step of initiating a call to the destination phone number includes initiating the call by the voice mail resource using an IP telephony gateway.

19. The medium of claim 18, wherein the step of establishing the second RTP data stream includes initiating the second RTP data stream in response to detecting an off hook condition at the destination phone number.

20. The medium of claim 19, wherein the connecting step includes:

sending the destination party a prompt whether to establish a connection with the voice mail subscriber; and detecting an acknowledgment to the prompt from the destination party as the first prescribed condition.

21. A computer readable medium having stored thereon sequences of instructions for executing voice mail services by a voice mail resource for a voice mail subscriber, the sequences of instructions including instructions for performing the steps of:

establishing a first Real Time Protocol (RTP) data stream for a voice mail session with the voice mail subscriber according to H.323 protocol;

initiating a second RTP data stream to a destination party in response to reception of a prescribed command from the voice mail subscriber;

connecting the first and second RTP data streams in response to detecting a first prescribed condition from the destination party; and resuming the voice mail session with the voice mail resource in response to detecting a second prescribed condition between the voice mail subscriber and the destination party;

wherein the step of connecting the first and second RTP data streams includes closing the first and second RTP data streams to the voice mail resource by sending to an IP telephony gateway, configured for establishing the first and second RTP data streams with the voice mail subscriber and the destination party, respectively, Empty Capability Set messages across an H.245 protocol channel for the first and second RTP data streams, respectively, wherein the IP telephony gateway in response closes the first and second RTP data streams to the voice mail resource.

22. The medium of claim 21, wherein the step of connecting the first and second RTP data streams further includes:

resetting the IP telephony gateway to an initialized state by sending a Non-Empty Capability Set message for the first and second RTP data streams; and connecting within the IP telephony gateway a first port servicing the first RTP data stream with a second port servicing the second RTP data stream.

23. The medium of claim 22, wherein the step of connecting the first and second port includes supplying to the IP telephony gateway a first RTP port number specifying the first port for connection with the second port, and a second RTP port number specifying the second port for connection with the first port.

24. The medium of claim 22, wherein the resuming step includes:

detecting a disconnect message based on the destination party disconnecting from the second RTP data stream;

sending an acknowledgment to the IP telephony gateway to clear the second RTP data stream; and reconnecting with the first RTP data stream to resume the voice mail session.

25. The medium of claim 24, wherein the reconnecting step includes:

reissuing an Empty Capability Set Message to the IP telephony gateway for the first RTP data stream; and setting up the first RTP data stream for reception by the voice mail resource.

26. The medium of claim 17, wherein the resuming step includes:

detecting a disconnect message based on the destination party disconnecting from, the second RTP data stream;

sending an acknowledgment to an IP telephony gateway to clear the second RTP data stream; and reconnecting with the first RTP data stream to resume the voice mail session.

27. A computer readable medium having stored thereon sequences of instructions for executing voice mail services by a voice mail resource for a voice mail subscriber, the sequences of instructions including instructions for performing the steps of:

establishing a first Real Time Protocol (RTP) data stream for a voice mail session with the voice mail subscriber according to H.323 protocol;

initiating a second RTP data stream to a destination party in response to reception of a prescribed command from the voice mail subscriber;

connecting the first and second RTP data streams in response to detecting a first prescribed condition from the destination party; and resuming the voice mail session with the voice mail resource in response to detecting a second prescribed condition between the voice mail subscriber and the destination party;

wherein the resuming step includes:
(1) detecting a disconnect message based on the destination party disconnecting from the second RTP data stream,
(2) sending an acknowledgment to an IP telephony gateway to clear the second RTP data stream and
(3) reconnecting with the first RTP data stream to resume the voice mail session;

wherein the reconnecting step includes:
(1) issuing an Empty Capability Set Message to the IP telephony gateway for the first RTP data stream; and
(2) setting up the first RTP data stream for reception by the voice mail resource.

* * * * *